(12) United States Patent
Gunderson

(10) Patent No.: US 9,677,668 B2
(45) Date of Patent: Jun. 13, 2017

(54) HYDRAULIC PARK GEAR ASSEMBLY

(71) Applicant: GM Global Technology Operations LLC, Detroit, MI (US)

(72) Inventor: Joel H. Gunderson, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 87 days.

(21) Appl. No.: 14/800,929

(22) Filed: Jul. 16, 2015

(65) Prior Publication Data
US 2017/0016533 A1    Jan. 19, 2017

(51) Int. Cl.
*F16H 63/34* (2006.01)
*B60T 1/00* (2006.01)
*F16D 63/00* (2006.01)

(52) U.S. Cl.
CPC .......... *F16H 63/3483* (2013.01); *B60T 1/005* (2013.01); *F16D 63/006* (2013.01); *F16H 63/3425* (2013.01)

(58) Field of Classification Search
CPC ... F16H 63/3483; F16H 63/3425; B60T 1/005
See application file for complete search history.

(56) References Cited

U.S. PATENT DOCUMENTS

| | | | |
|---|---|---|---|
| 6,725,962 B1* | 4/2004 | Fukuda | F16D 63/006 180/292 |
| 7,861,839 B2* | 1/2011 | Schweiher | F16H 63/3433 192/220.2 |
| 8,844,703 B2* | 9/2014 | Jang | B60T 1/005 192/219.5 |
| 9,205,813 B2* | 12/2015 | Yokota | F16H 63/3416 |
| 9,383,012 B2* | 7/2016 | Popp | F16H 63/34 |
| 2011/0146439 A1* | 6/2011 | Saitner | F16H 63/3491 74/473.25 |

* cited by examiner

Primary Examiner — Tinh Dang

(57) ABSTRACT

A park gear and pawl assembly for a vehicle transmission includes a park gear, a hydraulic control passage, a park pawl, a hydraulic pump, an abutment assembly, a park rod, and a hydraulic actuator. The park gear is fixed for common rotation to an output shaft of the transmission. The hydraulic passage is integrated into a housing of the transmission. The park pawl is engaged with the park gear when the park pawl is in a first position. The hydraulic pump includes an input member and output port. The input member is drivingly connected to the output shaft of the transmission and the output port is in communication with the hydraulic. The park rod at least partially disposed in the abutment assembly. The hydraulic actuator axially actuated via hydraulic fluid pressure in the hydraulic passage.

20 Claims, 1 Drawing Sheet

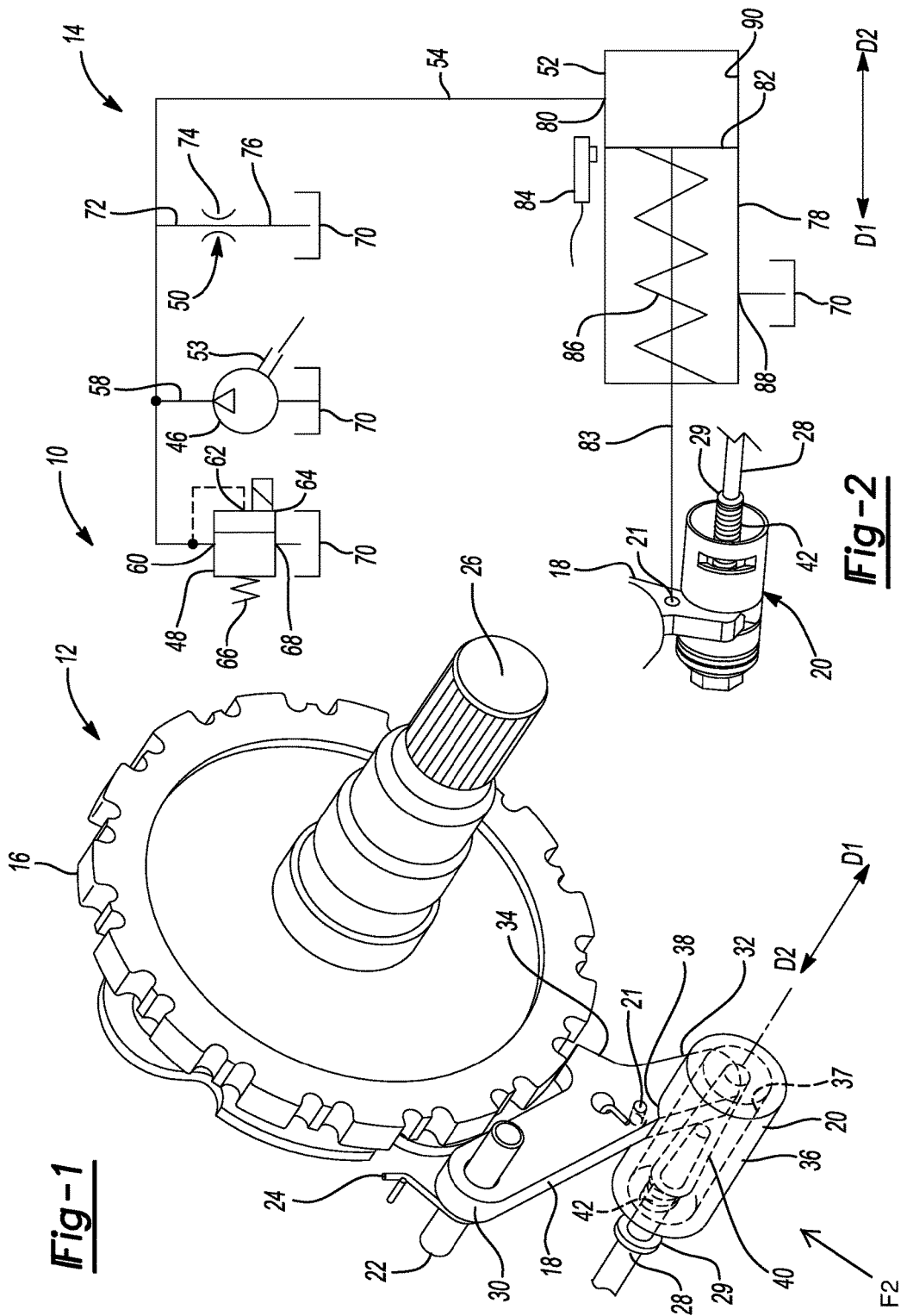

HYDRAULIC PARK GEAR ASSEMBLY

FIELD

The present invention relates generally to a park system for a transmission and more particularly to a park pawl assembly and hydraulic control system for a park system of a transmission.

BACKGROUND

The statements in this section merely provide background information related to the present disclosure and may or may not constitute prior art.

Automotive transmissions typically include a park lock mechanism that prevents the vehicle from rolling when the vehicle is stopped. The park lock mechanism can include a park gear and a park pawl. The park gear is fixed for common rotation with the output of the transmission. The park pawl is rotated to engage the park gear by a ramped bullet-shaped member when the speed of the output shaft is slow enough to permit engagement. The park pawl becomes disengaged from the park gear when the bullet-shaped member is retracted and a spring urges the pawl out of engagement with the gear teeth of the park gear. However, the bullet-shaped member attempts to urge the park pawl toward the park gear even when the park gear is still moving. This causes both objectionable noise complaints from drivers as well as durability issues with the park pawl and gear. Therefore, while the current system achieves the goal of a functional transmission park mechanism, there exists a need in the art for a park mechanism that is cost effective, quiet, and durable.

SUMMARY

A park gear and pawl assembly for a vehicle transmission is provided. The assembly includes a park gear, a hydraulic passage, a park pawl, a hydraulic pump, an abutment assembly, and a hydraulic actuator. The park gear is fixed for common rotation to an output shaft of the transmission. The hydraulic passage integrated into a housing of the transmission. The park pawl is engagable with the park gear. The hydraulic pump has an input member and output port. The input member is drivingly connected to the output shaft of the transmission. The output port is in communication with the hydraulic passage. The hydraulic pump outputs hydraulic fluid having a first pressure and a first flow rate. The abutment assembly has a slot and a bore. The park pawl is disposed in the slot when the park pawl is disengaged from the park gear. The hydraulic actuator has a piston, a piston rod, an apply chamber and an input port. The piston is drivingly connected for common axial movement with the piston rod. The apply chamber is in communication with the hydraulic passage through the input port. The piston rod is translated to engage the parking pawl when the hydraulic passage is pressurized and the parking pawl is disposed with the slot of the abutment assembly.

In one embodiment of the present invention, the park gear and pawl assembly further includes a relief valve having an input port in communication with the hydraulic passage. The relief valve caps the hydraulic pressure in the hydraulic passage at a predetermined pressure.

In another embodiment of the present invention, the relief valve further includes a biasing member, a valve spool disposed in a bore, and a pressure port. The input port is in communication with the bore. The pressure port is disposed on a first end of the bore valve and in communication with the hydraulic passage. The biasing member is disposed between a second end of the bore and the valve spool.

In yet another embodiment of the present invention, the assembly includes a bleed valve having an input port, an output port, and a orifice. The input port is in communication with the hydraulic passage. The hydraulic fluid passes through the orifice below the first flow rate. The output port is in communication with the orifice and a sump.

In yet another embodiment of the present invention, the predetermined first flow rate of the bleed valve is lower than a flow rate of the hydraulic fluid pump.

In yet another embodiment of the present invention, the hydraulic actuator further includes a housing, a bore, an input port, and a spring. The piston is disposed in the bore and coordinates with the housing to form the apply chamber and a spring chamber. The spring is disposed in the spring chamber urging the piston to the direction of the apply chamber.

In yet another embodiment of the present invention, the assembly further includes a biasing member and a pawl pivot pin. The biasing member is disposed on the pawl pivot pin and urges the park pawl toward the slot of the abutment assembly.

In yet another embodiment of the present invention, the park pawl has a first end, a second end, a gear engagement portion, and a abutment portion. The first end includes a first bore that receives the pawl pivot pin. The gear engagement portion is disposed on one side of the park pawl proximate the second end of the park pawl. The abutment portion is disposed on the opposite side of the park pawl from the engagement portion and includes a bore that receives the piston rod when actuated.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 1 is a perspective view of a park gear assembly according to the present invention; and FIG. 2 is a partial schematic view and perspective view of a park gear assembly according to the present invention.

DETAILED DESCRIPTION

The following description is merely exemplary in nature and is not intended to limit the present disclosure, application, or uses.

Referring to the drawings, wherein like reference numbers refer to like components, in FIG. 1 a park gear assembly 10 is illustrated. The park gear assembly 10 includes a parking gear and pawl apparatus 12 and a hydraulic circuit 14. The parking gear and pawl apparatus 12 includes a park gear 16, a park pawl 18, an abutment assembly 20, a pawl shaft 22, and a return spring 24. More specifically, the park gear 16 is rotatably fixed to an output shaft 26 of a transmission (not shown). The park pawl 18 has a first end 30 pivotably supported by the pawl shaft 22, a second end 32 received by the abutment assembly 20, a gear engagement portion 34 extending towards the park gear 16, and a bore or hole 21 disposed proximate the gear engagement portion 34. The return spring 24 is a coil spring having extended end portions configured to rotate the park pawl in a clockwise manner or a direction that disengages the park pawl 18 from the park gear 16.

The abutment assembly 20 is supported by a housing (not shown) of the transmission and includes an abutment assembly housing 36, a parking rod 28, a spring 42, and a conical or bullet-shaped member 40. For example, the abutment housing 36 includes a center bore 37 and a slot 38. The slot 38 of the abutment housing 36 is configured to receive the park pawl 18. The park rod 28 is disposed coaxially with the abutment assembly 20 and is capable of movement in the axial directions D1, D2. The bullet-shaped member 40 is disposed in the center bore 37 of the abutment assembly housing 36 and is slidingly supported by the parking rod 28. Thus, the spring 42 is disposed between a spring stop 29 of the parking rod 28 and the bullet-shaped member 40. The slot 38 receives the park pawl 18 when the park pawl 18 is in a disengaged position. The bullet-shaped member 40 includes a ramped outer surface on which the park pawl 18 is generally urged to contact by the spring 24. The park rod 28 is disposable in each of two positions; in a first position the park rod 28 is extended to the first axial direction D1 and in a second position F2 the park rod 28 is extended to the second axial direction D2. When the park rod 28 is in the first position, the park rod 28 compresses the spring 42, the spring 42 applies a resilient force on the bullet-shaped member 40 in the direction D1, and the park pawl 18 is urged to rotate towards engagement with the park gear 16. When the park rod 28 is in the second position F2 as shown in FIG. 1, the park rod 28 is engaged with the abutment portion 36 of the park pawl 18.

The hydraulic circuit 14 of the park gear assembly 10 includes a hydraulic pump 46, a relief valve 48, a bleed valve 50, a hydraulic actuator 52, and a hydraulic passage 54. The hydraulic pump 46, for example, has an input shaft or gear 53 and an output port 58. The input shaft 53 is drivingly connected for common rotation with the output shaft 26 of the transmission so that the hydraulic pump 46 rotates at the same speed as the output shaft 26. Thus, the hydraulic pump communicates a pressurized hydraulic fluid to the hydraulic passage 54 through the output port 58 only when the output shaft 26 of the transmission is rotating. The relief valve 48 has an input port 60, a pressure port 62, a solenoid 64, a spring 66, and an output or exhaust port 68. The input port 60 is in communication with the hydraulic passage 54 and selective communication with the output port 68. The pressure port 62 is in communication with the hydraulic passage 54 and a first end of the solenoid 64. The spring 66 biases the valve 48 towards the pressure port 62 when pressure in the hydraulic passage 54 is below a predetermined amount. When pressure in the hydraulic passage 54 exceeds the predetermined amount or solenoid 64 is energized, the solenoid 64 translates towards the spring 66 and allows hydraulic fluid to exhaust to a sump 70.

The bleed valve 50 has an input port 72 a narrow passage or orifice 74, and an output port 76. The input port 72 is in communication with the hydraulic passage 54 and the narrow passage 74. The output port is communication with the narrow passage 74 and the sump 70. The bleed valve 50 allows pressurized hydraulic fluid to bleed from the hydraulic passage 54 to the sump 70 to effectively depressurize the hydraulic passage 54 after the hydraulic pump 46 ceases to pressurize the hydraulic passage 54.

The hydraulic actuator 52 has a housing 78, an input port 80, an actuating piston 82, a piston rod 83, a position sensor 84, a spring 86, and an output port 88. The piston 82 is disposed in the housing 78 and combines to form a apply chamber 90. The input port 80 is in communication with each of the hydraulic passage 54 and the apply chamber 90 of the hydraulic actuator 52. The piston 82 is drivingly connected to the piston rod 83. The piston rod 83 extends from the housing 78 towards the parking pawl 18 and the abutment assembly 20. The spring 86 is disposed in the housing 78 adjacent to the piston 82 and urges the piston 82 towards the apply chamber 90 or the direction D2. The position sensor 84 is disposed on the housing 78 for detecting the position of the piston 82. The output port 88 is in communication with the portion of the housing 78 opposite the apply chamber 90 and the sump 70. The output port 88 allows hydraulic fluid that has leaked out of the apply chamber 90 past the piston 82 to exhaust to the sump 70.

With continuing reference to FIG. 1, the operation of the park gear assembly 10 will now be described. The park pawl 18 is selectively engaged and disengaged with the park gear 16 to prevent, or allow, the park gear 16 and the output shaft 26 to rotate. When the transmission output shaft 26 is rotating, and thus the vehicle is moving, the hydraulic pump 46 increases the hydraulic pressure in the hydraulic passage 54. Once the hydraulic pressure reaches a threshold level and the park rod 28 is in the second position F2, the piston 82 translates and thus actuates the piston rod 83 toward the abutment assembly 20 so that the piston rod 83 engages the bore or hole 21 of the park pawl 18 to prevent it from rotating and engaging with the park gear 16 while the park gear 16 is rotating with the output shaft 26. When the transmission output shaft 26 stops rotating, and thus the vehicle is not moving, the hydraulic pump 46 stops pressurizing the hydraulic passage 54 allowing the bleed valve 50 to dissipate the pressure of the hydraulic fluid in the hydraulic passage 54, the hydraulic pressure in the apply chamber 90 drops, the spring 86 actuates the piston 82 and thus the piston rod 83 away from the abutment assembly 20 and disengaging the piston rod 83 from the park pawl 18 to allow the park pawl 18 to rotate and engage the stationary park gear 16.

The description of the invention is merely exemplary in nature and variations that do not depart from the gist of the invention are intended to be within the scope of the invention. Such variations are not to be regarded as a departure from the spirit and scope of the invention.

What is claimed is:

1. A park gear and pawl assembly for a vehicle transmission, the assembly comprising:
    a park gear fixed for common rotation to an output shaft of the transmission;
    a hydraulic passage integrated into a housing of the transmission;
    a park pawl, and wherein the park pawl is engageable with the park gear;
    a hydraulic pump having an input member and output port, and wherein the input member is drivingly connected to the output shaft of the transmission, the output port is in communication with the hydraulic passage, and the hydraulic pump outputs hydraulic fluid having a first pressure and a first flow rate;
    an abutment assembly having a slot and a bore, and wherein the park pawl is disposed in the slot when the park pawl is disengaged from the park gear; and
    a hydraulic actuator having a piston, a piston rod, an apply chamber and an input port, and wherein the piston is drivingly connected for common axial movement with the piston rod, the apply chamber is in communication with the hydraulic passage through the input port, and the piston rod is translated to engage the parking pawl when the hydraulic passage is pressurized and the parking pawl is disposed with the slot of the abutment assembly.

2. The park gear and pawl assembly of claim 1 wherein the assembly further includes a relief valve having an input port in communication with the hydraulic passage, and wherein the relief valve caps the hydraulic pressure in the hydraulic passage at a predetermined pressure.

3. The park gear and pawl assembly of claim 2 wherein the relief valve further includes a biasing member, a valve spool disposed in a bore, and a pressure port, and wherein the input port is in communication with the bore, the pressure port is disposed on a first end of the bore valve and in communication with the hydraulic passage and the bore, the biasing member is disposed between a second end of the bore and the valve spool.

4. The park gear and pawl assembly of claim 1 further including a bleed valve having an input port, an output port, and a orifice, and wherein the input port is in communication with the hydraulic passage, hydraulic fluid passes through the orifice below the first flow rate, and the output port is in communication with the orifice and a sump.

5. The park gear and pawl assembly of claim 4 wherein the predetermined first flow rate of the bleed valve is lower than a flow rate of the hydraulic fluid pump.

6. The park gear and pawl assembly of claim 1 wherein the hydraulic actuator further includes a housing, a bore, an input port, and a spring, and wherein the piston is disposed in the bore and coordinates with the housing to form the apply chamber and a spring chamber, and the spring is disposed in the spring chamber urging the piston to the direction of the apply chamber.

7. The park gear and pawl assembly of claim 1 further including a biasing member and a pawl pivot pin, and wherein the biasing member is disposed on the pawl pivot pin and urges the park pawl toward the slot of the abutment assembly.

8. The park gear and pawl assembly of claim 7 wherein the park pawl has a first end, a second end, a gear engagement portion, and a abutment portion, and wherein the first end includes a first bore that receives the pawl pivot pin, the gear engagement portion is disposed on one side of the park pawl proximate the second end of the park pawl, the abutment portion is disposed on the opposite side of the park pawl from the engagement portion and includes a bore that receives the piston rod when actuated.

9. A park gear and pawl assembly for a vehicle transmission, the assembly comprising:
a park gear fixed for common rotation to an output shaft of the transmission;
a hydraulic passage integrated into a housing of the transmission;
a park pawl, and wherein the park pawl is engageable with the park gear;
a hydraulic pump having an input member and output port, and wherein the input member is drivingly connected to the output shaft of the transmission, the output port is in communication with the hydraulic passage, and the hydraulic pump outputs hydraulic fluid having a first pressure and a first flow rate;
a relief valve having an input port in communication with the hydraulic passage, and wherein the relief valve caps the hydraulic pressure in the hydraulic passage at a predetermined pressure;
an abutment assembly having a slot and a bore, and wherein the park pawl is disposed in the slot when the park pawl is disengaged from the park gear; and
a hydraulic actuator having a piston, a piston rod, an apply chamber and an input port, and wherein the piston is drivingly connected for common axial movement with the piston rod, the apply chamber is in communication with the hydraulic passage through the input port, and the piston rod is translated to engage the parking pawl when the hydraulic passage is pressurized and the parking pawl is disposed with the slot of the abutment assembly.

10. The park gear and pawl assembly of claim 9 wherein the relief valve further includes a biasing member, a valve spool disposed in a bore, and a pressure port, and wherein the input port is in communication with the bore, the pressure port is disposed on a first end of the bore valve and in communication with the hydraulic passage and the bore, the biasing member is disposed between a second end of the bore and the valve spool.

11. The park gear and pawl assembly of claim 9 further including a bleed valve having an input port, an output port, and a orifice, and wherein the input port is in communication with the hydraulic passage, hydraulic fluid passes through the orifice below the first flow rate, and the output port is in communication with the orifice and a sump.

12. The park gear and pawl assembly of claim 11 wherein the predetermined first flow rate of the bleed valve is lower than a flow rate of the hydraulic fluid pump.

13. The park gear and pawl assembly of claim 9 wherein the hydraulic actuator further includes a housing, a bore, an input port, and a spring, and wherein the piston is disposed in the bore and coordinates with the housing to form the apply chamber and a spring chamber, and the spring is disposed in the spring chamber urging the piston to the direction of the apply chamber.

14. The park gear and pawl assembly of claim 9 further including a biasing member and a pawl pivot pin, and wherein the biasing member is disposed on the pawl pivot pin and urges the park pawl toward the slot of the abutment assembly.

15. The park gear and pawl assembly of claim 14 wherein the park pawl has a first end, a second end, a gear engagement portion, and a abutment portion, and wherein the first end includes a first bore that receives the pawl pivot pin, the gear engagement portion is disposed on one side of the park pawl proximate the second end of the park pawl, the abutment portion is disposed on the opposite side of the park pawl from the engagement portion and includes a bore that receives the piston rod when actuated.

16. A park gear and pawl assembly for a vehicle transmission, the assembly comprising:
a park gear fixed for common rotation to an output shaft of the transmission;
a hydraulic passage integrated into a housing of the transmission;
a park pawl, and wherein the park pawl is engageable with the park gear, and wherein the park pawl is disposed on a pawl pivot pin, and a biasing member urges the park pawl away from the park gear;
a hydraulic pump having an input member and output port, and wherein the input member is drivingly connected to the output shaft of the transmission, the output port is in communication with the hydraulic passage, and the hydraulic pump outputs hydraulic fluid having a first pressure and a first flow rate;

a relief valve having an input port in communication with the hydraulic passage, and wherein the relief valve caps the hydraulic pressure in the hydraulic passage at a predetermined pressure;

a bleed valve having an input port, an output port, and a orifice, and wherein the input port is in communication with the hydraulic passage, hydraulic fluid passes through the orifice below the first flow rate, and the output port is in communication with the orifice and a sump;

an abutment assembly having a slot and a bore, and wherein the park pawl is disposed in the slot when the park pawl is disengaged from the park gear; and a hydraulic actuator having a piston, a piston rod, an apply chamber and an input port, and wherein the piston is drivingly connected for common axial movement with the piston rod, the apply chamber is in communication with the hydraulic passage through the input port, and the piston rod is translated to engage the parking pawl when the hydraulic passage is pressurized and the parking pawl is disposed with the slot of the abutment assembly.

17. The park gear and pawl assembly of claim 16 wherein the relief valve further includes a biasing member, a valve spool disposed in a bore, and a pressure port, and wherein the input port is in communication with the bore, the pressure port is disposed on a first end of the bore valve and in communication with the hydraulic passage and the bore, the biasing member is disposed between a second end of the bore and the valve spool.

18. The park gear and pawl assembly of claim 17 wherein the predetermined first flow rate of the bleed valve is lower than a flow rate of the hydraulic fluid pump.

19. The park gear and pawl assembly of claim 18 wherein the hydraulic actuator further includes a housing, a bore, an input port, and a spring, and wherein the piston is disposed in the bore and coordinates with the housing to form the apply chamber and a spring chamber, and the spring is disposed in the spring chamber urging the piston to the direction of the apply chamber.

20. The park gear and pawl assembly of claim 19 wherein the park pawl has a first end, a second end, a gear engagement portion, and a abutment portion, and wherein the first end includes a first bore that receives the pawl pivot pin, the gear engagement portion is disposed on one side of the park pawl proximate the second end of the park pawl, the abutment portion is disposed on the opposite side of the park pawl from the engagement portion and includes a bore that receives the piston rod when actuated.

* * * * *